March 19, 1963      E. L. SWAINSON        3,081,991
             TRANSVERSE SUPPORTED TORSION BAR
                   Filed July 12, 1960
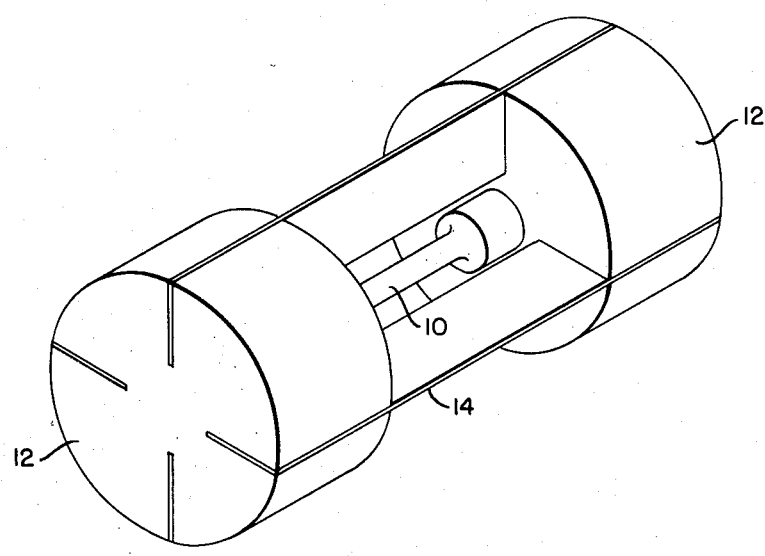
                                    *INVENTOR.*
                             EDWARD L. SWAINSON
                         *BY*
                         KENWAY, JENNEY, WITTER & HILDRETH
                                    ATTORNEYS

United States Patent Office 3,081,991
Patented Mar. 19, 1963

3,081,991
TRANSVERSE SUPPORTED TORSION BAR
Edward L. Swainson, Newtonville, Mass., assignor to Northrop Corporation, Beverly Hills, Calif., a corporation of California
Filed July 12, 1960, Ser. No. 42,287
3 Claims. (Cl. 267—1)

This invention relates to torsional springs and more particularly comprises a new and improved transversely supported torsion bar suitable for use in various types of instruments where large lateral and compression forces are encountered.

In the construction of rate gyroscopes, for example, the gimbal is often supported for pivotal movement either wholly or in part by a torsion bar. In such cases, the torsion bar is subjected to large transverse forces when the gyroscope is vibrated, or accelerated in a direction perpendicular to the axis of the torsion bar. In the absence of effective side supports, the torsion bar must be designed with sufficient strength in the transverse plane to withstand this loading. To meet this situation, torsion bars heretofore have been made as short as possible and operated at a high level of torsional stress. However, such an arrangement introduces hysteresis in torsion, which is undesirable in any instrument.

Another measure commonly employed to increase the transverse load capacity of a torsion bar is to surround the movable end of the bar with an annular ring fixed to a stationary portion of the assembly. Under conditions of low side loading force there will be a small clearance between the protective ring and the movable end of the torsion bar. Upon an increase in the side loading force, such as occurs from shock, vibration or acceleration, the movable end of the bar will deflect sideways until it contacts the surrounding ring. Further bending and possible breaking is thereby prevented, but at the same time, an objectionable amount of friction is introduced into the system.

To alleviate this friction, a ball bearing assembly may be interposed between the free end of the torsion bar and the protective ring with a small clearance gap left between the ball bearing races and either the outer protective ring or the inner hub of the torsion bar. This arrangement wlil reduce the friction in the system, but there still remains the frictional uncertainties of the ball bearing. Coupled with the further problem involved in initially cleaning the ball bearing and maintaining it in a thoroughly clean condition throughout its life, there must be considered the wear factor of the bearing which may change the friction level with time.

In some instances, the transverse strength of the torsion bars have been increased by machining them to a cruciform cross section. Torsion bars of this type are difficult to manufacture, particularly in miniature size, and the surface finish is generally less satisfactory than that of the cylindrical torsion bar. Also, it is quite difficult to maintain precise uniformity of cross section over the length of the cruciform-shaped bar which will result in varying stress levels throughout its active length.

It is an object of the present invention to increase the lateral and compression load-carrying capacity of pivoted mountings without impeding free frictionless movement.

Another object of the present invention is to improve the linear response of torsional springs.

Yet another object of this invention is to provide a strong torsional spring operative at low stress levels to reduce hysteresis.

More particularly, this invention features a torsion bar connecting a pair of enlarged end hubs with a plurality of radially arranged transverse support members in the form of thin, flat strips also interposed between the hubs.

These and other features as well as further objects and advantages of the invention, will appear from a detailed description of the invention taken in connection with the accompanying drawing, in which the single FIGURE is a view in perspective of a frictionless torsion device made according to the invention.

Referring now to the drawing, there is illustrated a relatively long thin torsion bar 10 of cylindrical configuration having at each end an integrally formed massive, cylindrical hub 12. If desired, either or both end hubs may be fashioned separately and subsequently secured to the torsion bar in some suitable manner. Although both hubs are illustrated as solid cylinders, it will be obvious that the specific shape of either or both may be altered to suit the particular environment in which the device is placed. It will be understood that in a particular installation, one hub will be fixed in position while the other will be pivotally movable.

As may be observed from the drawing, spaced longitudinal slots are cut radially into the hubs at 90° intervals in such a manner that the slots in one hub are aligned with the slots in the other hub. Extending between the hubs 12 is a plurality of transverse supporting members in the form of thin, flat strips or leaf springs 14 having their respective terminal portions projecting into opposite aligned slots.

The springs are disposed in planes perpendicular to the flat faces of the hub and may be secured in position by soldering, brazing, welding, clamping, cementing or any other suitable means. The particular method is of little importance as long as the strips are held from slipping under side loading. Although the illustrated embodiment is shown with four leaf springs, the number may be varied to suit particular requirements.

Certain definite advantages accrue from a transversely supported torsion bar such as that disclosed herein. For instance, torsion bars are strong in torsional strength and give a more linear response than do conventional leaf springs. However, torsion bars by themselves, unless made extremely short and operated at a high level of stress, are weak in transverse rigidity. By providing a torsion bar supported by the strips shown, it is possible to utilize a relatively long thin torsional member which can function at a low torsional stress level, thereby avoiding the hysteresis effect encountered by short torsion bars. Coupled with this advantage is the resulting increase in transverse strength and improvement in linear response.

The transverse supporting strips 14, will, of course, add to the spring rate of the torsion bar 10. The ratio of the two spring rates may be established at any desired value by proper design consideration given to the dimensions of the torsion bar portion versus the size of the leaf springs. In general, it may be said that deflection characteristics may be made more linear by designing the device so that the torsion bar will provide most of the torsional stiffness while, at the same time, designing the leaf springs so that they are weak in torsion but strong in transverse stiffness.

The construction described offers great freedom in the design of the device and of its environment since not only can the responsiveness of the device be controlled by proper design, but also the added transverse strength will improve its supporting characteristics.

In practice, it is desirable to assemble the device so that the support strips 14 are mounted under a certain amount of tension to avoid the "oil-can" snap action effect that might otherwise occur if the springs were assembled in a state of compression along their length.

Those skilled in the art will readily appreciate that numerous modifications of the illustrated embodiment may be made without departing from the spirit of the invention. For instance, while four leaf springs are shown, the particular number of leaf springs utilized in the device may be increased or decreased as desired. Also at least one of the hubs could be made separately with the leaf springs machined or otherwise formed integrally therewith and subsequently assembled to the torsion bar. By this mode of construction, slots need be machined in only one of the hubs, which hub could be formed either integral or separate from the torsion bar. Therefore, it is not intended that the scope of the invention be limited to the particular embodiment illustrated and described, but that its breadth be determined by the appended claims and their equivalents.

Having thus described my invention, what I claim as new and desire to secure by Letters Patent of the United States is:

1. A torsional spring assembly, comprising a torsion bar having a relatively high spring rate in torsion and being relatively flexible transversely of a longitudinal axis thereof, a pair of hubs secured axially on opposite ends of said bar for rotation relative to one another, and a plurality of leaf springs circumferentially-spaced about said bar and rigidly secured at opposite ends thereof in said hubs, said springs being relatively stiff transversely of said axis and having a relatively low spring rate in torsion thereabout.

2. A torsional spring assembly as recited in claim 1, in which said leaf springs are secured in tension to said hubs and subject said torsion bar to compressional loading along said axis.

3. A torsional spring assembly as recited in claim 1, in which said leaf springs comprise flat strips whose major surfaces lie in planes substantially radial to said axis of said bar.

References Cited in the file of this patent

UNITED STATES PATENTS

| | | |
|---|---|---|
| 2,694,319 | Johnson | Nov. 16, 1954 |
| 2,821,860 | Huston | Feb. 4, 1958 |

FOREIGN PATENTS

| | | |
|---|---|---|
| 218,114 | Great Britain | July 3, 1924 |